(12) United States Patent
Stanley

(10) Patent No.: US 7,246,822 B2
(45) Date of Patent: Jul. 24, 2007

(54) MOTORIZED SEAT BELT SYSTEM

(75) Inventor: James Gregory Stanley, Novi, MI (US)

(73) Assignee: TK Holdings Inc., Auburn Hills, MI (US)

( * ) Notice: Subject to any disclaimer, the term of this patent is extended or adjusted under 35 U.S.C. 154(b) by 0 days.

(21) Appl. No.: 11/216,071

(22) Filed: Sep. 1, 2005

(65) Prior Publication Data

US 2006/0043724 A1    Mar. 2, 2006

Related U.S. Application Data

(60) Provisional application No. 60/606,519, filed on Sep. 2, 2004.

(51) Int. Cl.
*B60R 22/36* (2006.01)

(52) U.S. Cl. .................................. 280/806

(58) Field of Classification Search ............ 280/806, 280/807; 297/474, 475, 477
See application file for complete search history.

(56) References Cited

U.S. PATENT DOCUMENTS

| 5,445,412 A | 8/1995 | Gillis et al. |
| 6,070,113 A | 5/2000 | White et al. |
| 6,213,512 B1 | 4/2001 | Swann et al. |
| 6,394,495 B1 | 5/2002 | Specht |
| 6,626,463 B1 | 9/2003 | Arima et al. |
| 6,722,698 B2 | 4/2004 | Viano et al. |
| 6,726,249 B2 | 4/2004 | Yano et al. |
| 2004/0036345 A1 | 2/2004 | Herberg et al. |
| 2004/0060762 A1 | 4/2004 | Tobata et al. |
| 2004/0182630 A1 | 9/2004 | Uchiyama et al. |

FOREIGN PATENT DOCUMENTS

EP    1 415 867 A    5/2004

*Primary Examiner*—Faye M. Fleming
(74) *Attorney, Agent, or Firm*—Foley & Lardner LLP

(57) ABSTRACT

A motorized seatbelt system for a vehicle includes a communications bus, a first motorized seat belt retractor, operably connected to the communication bus, having a first controller and a second motorized seat belt retractor, having a second controller, operably connected to the communications bus and the first motorized seat belt. The first and second motorized seat belt retractors may include an electric motor and a microprocessor. The first motorized seat belt retractor is deployed when the first controller detects a deployment event and the second controller enables the first motorized seat belt retractor. Similarly, the second motorized seat belt retractor is deployed when the second controller detects a deployment event and the first controller enables the second motorized seat belt retractor.

25 Claims, 3 Drawing Sheets

MOTORIZED SEAT BELT SYSTEM

CROSS-REFERENCE TO RELATED PATENT APPLICATIONS

This application claims the benefit of and priority to U.S. application Ser. No. 60/606,519, filed Sep. 2, 2004, which is incorporated by reference herein in its entirety.

BACKGROUND

The present invention is generally related to driver protection systems in automobiles. More specifically, the present invention is related to a motorized seat belt system.

Restraint systems such as motorized seat belt retractors (MSB) have become standard equipment in modern automobiles. Motorized seat belt retractors are widely used to protect passengers from the impact produced during a vehicle collision. Prior to a collision involving the vehicle, the MSB actuates a seat belt to protect the passenger. The MSB could be deployed because there are indications of an impending collision (an emergency situation), such as severe breaking or swerving of the vehicle, the dynamics of the vehicle indicate a potential rollover, or external sensor systems (e.g. radar, vision systems, etc) predict a high probability of a collision. The MSB could also be deployed at low force levels for comfort related reasons.

A motorized seat belt retractor includes an electric motor that operates to retract the seat belt in case of an emergency. The operation of the motor may be controlled by a signal generated by a microprocessor. As a result, there is the possibility of the motor operating and the MSB deploying in the event of a microprocessor failure. Avoiding inadvertent MSB deployment in the event of a microprocessor failure is a desired operational characteristic. Accordingly, there is a need for a cost efficient motorized seat belt system capable of preventing the inadvertent deployment of a motorized seat belt retractor.

SUMMARY

According to one embodiment of the invention, a motorized seatbelt system for a vehicle includes a motorized seat belt retractor, having a first controller for detecting a deployment event and determining a deployment mode and a second controller, operably coupled to the motorized seat belt retractor, wherein the second controller enables the deployment of the motorized seatbelt retractor upon detection of a deployment event.

According to another embodiment of the invention, a seatbelt system for a vehicle includes a communications bus, a plurality of motorized seat belt retractors, operably coupled to the communications bus, each having an associated controller and a safing controller, wherein one or more of the plurality of motorized seat belt retractors is deployed when the associated controller detects a deployment event and the safing controller enables one or more of the plurality of motorized seat belt retractors.

According to yet another embodiment of the invention, the communication bus is a controller area network bus configured to transport information required to deploy each of the plurality of motorized seat belt retractors.

According to another embodiment of the invention, the plurality of associated controllers determines a deployment mode for each of the associated plurality of motorized seat belt retractors.

According to still another embodiment of the invention, a motorized seatbelt system for a vehicle includes a communications bus, a first motorized seat belt retractor, operably connected to the communication bus, having a first controller and a second motorized seat belt retractor, having a second controller, operably connected to the communications bus and the first motorized seat belt. The first motorized seat belt retractor is deployed when the first controller detects a deployment event and the second controller enables the first motorized seat belt retractor and the second motorized seat belt retractor is deployed when the second controller detects a deployment event and the first controller enables the second motorized seat belt retractor.

It is to be understood that both the foregoing general description and the following detailed description are exemplary and explanatory only, and are not restrictive of the invention as claimed.

BRIEF DESCRIPTION OF THE DRAWINGS

These and other features, aspects and advantages of the present invention will become apparent from the following description, appended claims, and the accompanying exemplary embodiments shown in the drawings, which are briefly described below.

DETAILED DESCRIPTION

Embodiments of the present invention will be described below with reference to the accompanying drawings. It should be understood that the following description is intended to describe exemplary embodiments of the invention, and not to limit the invention.

A motorized seat belt can be triggered via a message from an interface BUS system (e.g., a CAN bus), but there could be problems if the microprocessor controlling the high current through the MSB's motor erroneously turns the high current on. To protect against a single microprocessor erroneously deploying the MSB, a "safing" strategy can be employed. In this context, safing refers to a second source, independent of the main microprocessor, that enables the deployment. Only when the second source also determines that there is an event worthy of a deployment will the MSB be deployed.

As mentioned above, the possibility of a single microprocessor failure inadvertently triggering a MSB, may be avoided by providing two microprocessors that independently determine that there is an event worthy of deployment of the MSB. Typically, one microprocessor does most of the work to determine the mode that the MSB should be deployed in. The second microprocessor identifies that there are messages on the CAN bus that contain information indicating that there may be a reason to deploy the MSB and enables the system only when there is evidence that any of the MSB modes should be deployed.

The information required to trigger the MSB may be carried over a communications bus, such as a Controller Area Network (CAN) bus. The CAN bus is a high-integrity serial data communications bus typically used for real-time applications. The CAN bus can operate at rates up to 1 Megabits per second.

Normally, there are at least two motorized seat belts in a vehicle (driver and passenger front seats). When the MSB controller is integrated onto the retractor, they are independent and each need their own safing function. For safing, or protecting against an erroneous or inadvertent microprocessor event (i.e. the microprocessor, for whatever reason, inadvertently deploys the MSB), each controller would require its own independent safing microprocessor.

One problem with using two separate microprocessors in each MSB controller is cost. Each microprocessor would need the capability to interpret the messages on the CAN bus. This could increase the cost of the individual MSB controllers. As there are usually two or more MSBs per vehicle, the cost increase for this safing function may be significant. As a result, there is a need to provide a system that provides the MSB safing function with a ratio of, at most, only one microprocessor per MSB controller.

Various embodiments of the present invention, as described below, provide MSB safing and remove the possibility of a single microprocessor inadvertently deploying the motorized seat belt.

Figure 1:
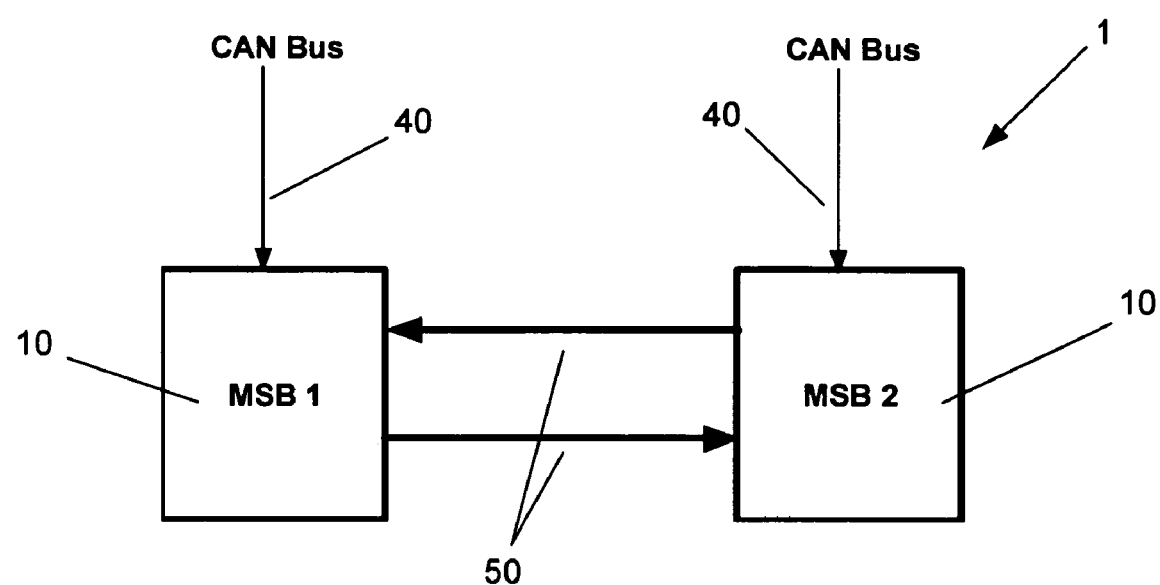
FIG. 1 is a block diagram of a motorized seat belt system according to one embodiment of the invention.
Figure 3:
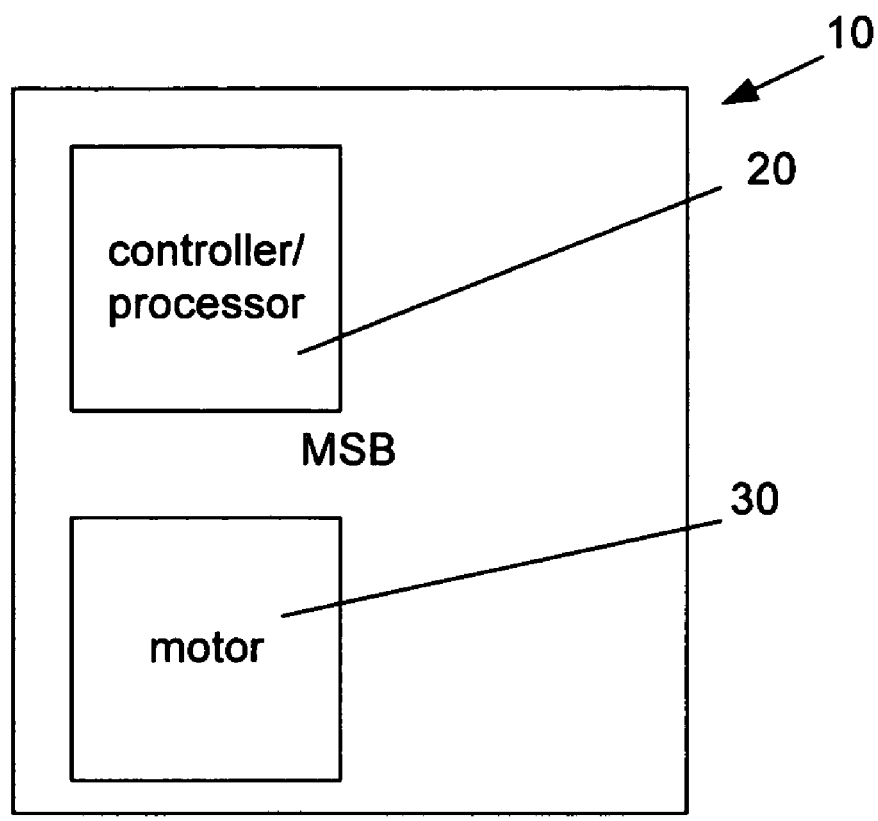
FIG. 3 is a block diagram of a motorized seat belt module according to one embodiment of the invention.

A motorized seat belt system 1, according to one embodiment of the invention, is shown in FIG. 1. According to one embodiment of this invention, each of the two MSB modules 10 (MSB1 and MSB2) or retractors provide a safing function for other. Both controllers 20 (see FIG. 3) receive the same messages from the CAN bus 40 and therefore both modules 10 can identify when a MSB should be deployed. According to this embodiment, two wires 50 extend between MSB1 and MSB2. These wires 50 transmit information that allows MSB1 to enable deployment on MSB2. For MSB2 to deploy, the main microprocessor 20 within MSB2 must determine the deployment mode and attempt to control the current sent to the MSB2 motor 30. Only when MSB1 has enabled MSB2, however, can MSB2 actually deploy. FIG. 1 shows the basic concept.

The mechanism for actually enabling the MSB2 is independent of the MSB2 microprocessor. There are several alternatives for implementing the enablement of the MSB 10 that may be employed.

However, the preferred method may depend on the electronic hardware design of the MSB2 current control system. For example, a relay may be in series with the high current path to the MSB2 motor. The wire from the MSB 1 controller could be used to enable current to the MSB2 relay coil (or drive the MSB2 relay coil directly). As a result, no current can go to the MSB2 motor unless the MSB 1 microprocessor decides that the MSB2 should deploy and enables the MSB2 series relay.

Another alternative scheme for MSB 10 enablement, may include providing an electronic switch (such as a field effect transistor). The switch may be positioned in MSB2 in the line providing the current to the MSB motor 30. The switch would be controlled by the signal transmitted from MSB1, for example. The MSB1 deployment would be enabled by the MSB2 controller in the same manner.

The two examples disclosed above (i.e., the relay and switch) are provided for exemplary purposes only. The scope of the present invention includes all of the numerous well known alternatives for controlling the flow of current to the motor.

Figure 2:
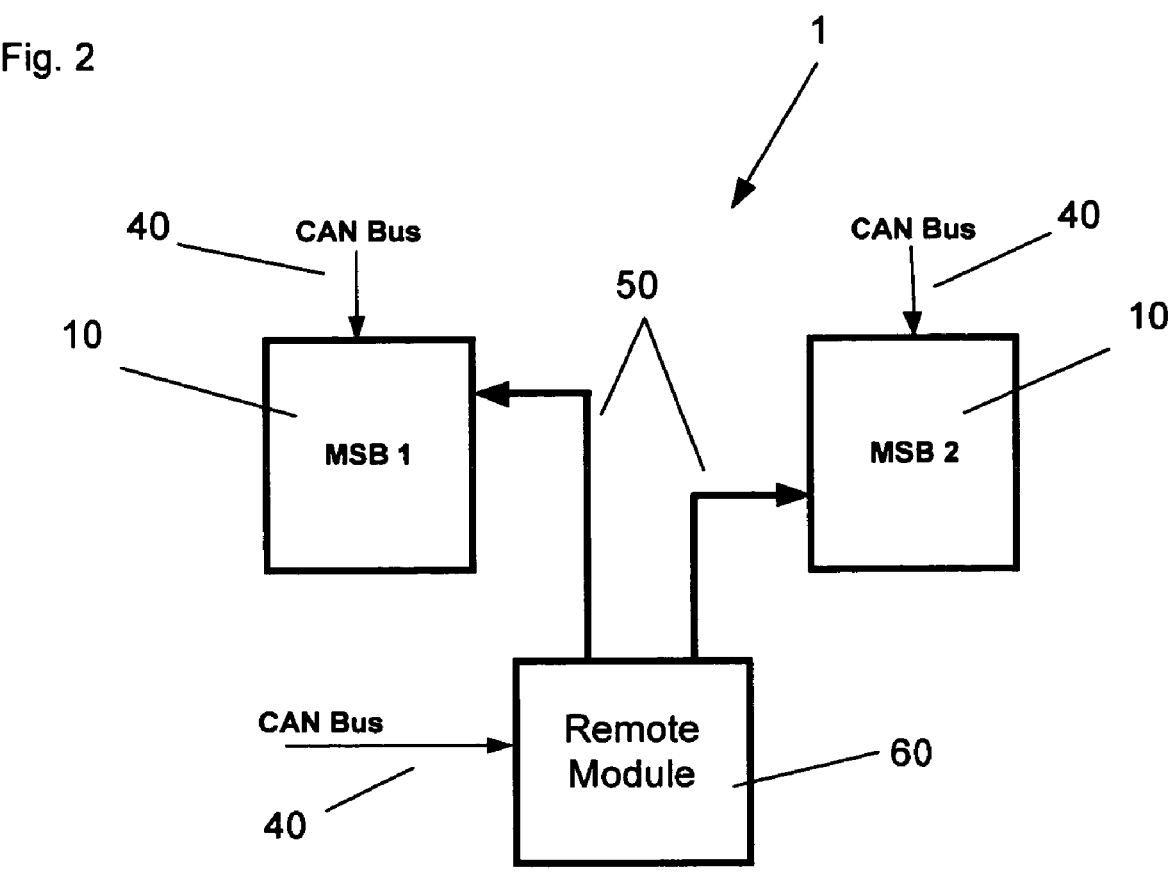
FIG. 2 is a block diagram of a motorized seat belt system according to one embodiment of the invention.

As shown in FIG. 2, another embodiment of the invention may include providing a remote module 60 or controller that will perform the safing function for the MSB controllers 10. The remote module 60 may be a module that is already within the vehicle such as, for example, the restraints control and diagnostic module. The remote module 60 would also be able to recognize a situation where the MSB modules 10 might be deployed. This could be because the remote module 60 also receives the same messages on the same CAN bus 40, or it could receive other information that is an indicator that the MSB might be deployed. The concept with the CAN bus 40 can be seen in FIG. 2. Again, the remote module 60 would enable the high current to the MSB motor 30, but could not actually send current to the MSB motor 30.

The foregoing description of a preferred embodiment of the invention has been presented for purposes of illustration and description. It is not intended to be exhaustive or to limit the invention to the precise form disclosed, and modifications and variations are possible in light of the above teaching or may be acquired from practice of the invention. The embodiment was chosen and described in order to explain the principles of the invention and as a practical application to enable one skilled in the art to utilize the invention in various embodiments and with various modification are suited to the particular use contemplated. It is intended that the scope of the invention be defined by the claims appended hereto and their equivalents.

What is claimed is:

1. A seatbelt system for a vehicle comprising:
   a first seatbelt retractor, for a first occupant's seat belt, including a first motor and a first controller; and
   a second seatbelt retractor, for a second occupant's seatbelt including a second motor;
   wherein the first controller is configured to control the operation of the second motor.

2. The system of claim 1, wherein the first controller is configured to control the operation of the first motor when the vehicle may be involved in a collision.

3. The system of claim 1, wherein the first controller includes a microprocessor.

4. The system of claim 1, wherein the second retractor includes a second controller.

5. The system of claim 4, wherein the second controller is configured to control the operation of the second motor when the vehicle may be involved in a collision.

6. The system of claim 4, wherein the system is configured so that operation of the second motor is controlled by both the first and second controllers.

7. A safety belt system for a vehicle comprising:
   a first seatbelt retractor, for a first occupant's seat belt, including a first motor;
   a second seatbelt retractor, for a second occupant's seat belt, including a second motor; and
   a safing controller configured to permit operation of the first and second motors.

8. The system of claim 7, wherein the first retractor includes a first controller configured to control operation of the first motor after the safing controller has provided an enabling signal.

9. The system of claim 7, wherein the safing controller provides a signal to the first and second retractors upon the detection of an emergency situation involving the vehicle to thereby permit operation of the first and second motors.

10. The system of claim 9, wherein the first retractor includes a motor controller for receiving the signal from the safing controller.

11. The system of claim 9, wherein the safing controller includes a microprocessor.

12. A motorized seatbelt system for a vehicle comprising:
   a communications bus;
   a first motorized seat belt retractor, operably connected to the communication bus, having a first controller; and a second motorized seat belt retractor, having a second controller, operably connected to the communications bus and the first motorized seat belt;

wherein the first motorized seat belt retractor is deployed when the first controller detects a deployment event and the second controller enables the first motorized seat belt retractor, and wherein the second motorized seat belt retractor is deployed when the second controller detects a deployment event and the first controller enables the second motorized seat belt retractor.

13. The motorized seatbelt system for a vehicle as claimed in claim 12, wherein the first and second motorized seat belt retractors include an electric motor.

14. The motorized seatbelt system for a vehicle as claimed in claim 12, wherein the first controller and second controller include a microprocessor.

15. The motorized seatbelt system for a vehicle as claimed in claim 12, wherein the communication bus is a controller area network bus.

16. A seatbelt system for a vehicle comprising:
a communications bus;
a plurality of motorized seat belt retractors, operably coupled to the communications bus, each having an associated controller; and
a safing controller, wherein one or more of the plurality of motorized seat belt retractors is deployed when the associated controller detects a deployment event and the safing controller enables one or more of the plurality of motorized seat belt retractors.

17. The motorized seatbelt system for a vehicle as claimed in claim 16, wherein each of the plurality of motorized seat belt retractors includes an electric motor.

18. The motorized seatbelt system for a vehicle as claimed in claim 16, wherein each of the plurality of associated controllers includes a microprocessor.

19. The motorized seatbelt system for a vehicle as claimed in claim 16, wherein the safing controller includes a microprocessor.

20. The motorized seatbelt system for a vehicle as claimed in claim 16, wherein the communication bus is a controller area network bus configured to transport information required to deploy each of the plurality of motorized seat belt retractors.

21. The motorized seatbelt system for a vehicle as claimed in claim 16, wherein each of the plurality of associated controllers determines a deployment mode for each of the associated plurality of motorized seat belt retractors.

22. The motorized seatbelt system for a vehicle as claimed in claim 16, wherein the safing controller enables one or more of the plurality of motorized seatbelt retractors when it is determined that any of the associated controllers should be deployed.

23. A motorized seatbelt system for a vehicle comprising:
a motorized seat belt retractor, having a first controller for detecting a deployment event and determining a deployment mode; and
a second controller, operably coupled to the motorized seat belt retractor, wherein the second controller enables the deployment of the motorized seatbelt retractor upon detection of a deployment event.

24. A seatbelt system for a vehicle comprising:
a first seatbelt retractor, for a first occupant's seat belt, including a first motor and a first controller; and
a plurality of seatbelt retractors, for a plurality of occupants, wherein the first controller is configured to control the operation of the plurality of seatbelt retractors.

25. A seatbelt system for a vehicle comprising:
a communications bus;
a plurality of motorized seat belt retractors, operably coupled to the communications bus, each having an associated controller; and
a safing controller, wherein the safing controller enables the operation one or more of the plurality of motorized seat belt retractors.

* * * * *